United States Patent [19]

Engeldinger et al.

[11] Patent Number: 5,434,211
[45] Date of Patent: Jul. 18, 1995

[54] HEAT-CURABLE ADHESIVE

[75] Inventors: Hans K. Engeldinger, Holtwisch; Jürgen Kramer, Stieglitzweg; Jürgen Siepmann, Kirchenstr, all of Germany

[73] Assignee: Beiersdorf Aktiengesellschaft, Hamburg, Germany

[21] Appl. No.: 180,181

[22] Filed: Jan. 11, 1994

Related U.S. Application Data

[63] Continuation of Ser. No. 796,197, Nov. 22, 1991, abandoned.

[30] Foreign Application Priority Data

Dec. 12, 1990 [DE] Germany .................. 40 39 636.3

[51] Int. Cl.$^6$ .................... C08K 3/18; C08K 3/22; C08J 5/14
[52] U.S. Cl. .................... 524/431; 524/445; 524/495; 523/149; 523/156; 523/158
[58] Field of Search .............. 524/431, 430, 447, 493, 524/594, 847, 445; 525/495; 523/149, 156, 158

[56] References Cited

U.S. PATENT DOCUMENTS

| | | | |
|---|---|---|---|
| 1,606,943 | 11/1926 | Huxham | 525/495 |
| 3,896,081 | 7/1975 | Baxter et al. | 525/495 |
| 3,910,857 | 10/1975 | Phillips | 260/38 |
| 4,075,155 | 2/1978 | Phillips | 524/594 |
| 4,105,604 | 8/1978 | Vargiu et al. | 525/495 |
| 4,216,133 | 8/1980 | Johnson et al. | 260/38 |
| 4,226,759 | 10/1980 | Chester | 524/431 |
| 4,268,657 | 5/1981 | Manzara | 528/155 |
| 4,539,343 | 9/1985 | Nishimura | 523/145 |
| 4,596,845 | 6/1986 | Koyama et al. | 524/594 |
| 4,925,887 | 5/1990 | Gunther et al. | 524/447 |

FOREIGN PATENT DOCUMENTS

| | | |
|---|---|---|
| 2925261 | 3/1981 | Germany . |
| 2853646 | 6/1982 | Germany . |
| 2923051 | 6/1982 | Germany . |
| 3617846 | 12/1987 | Germany . |

OTHER PUBLICATIONS

JP-A-58029850, Matsushita Denko, "Resin Modling Material", Abstract.
JP: 59108072, Nitto Electric; Derwent Pub. AN-84-191797 Abstract.
JP: 53061645, Matsushita, Derwent Pub. AN 78-503-77A; Abstract.
Article, Konstruktion 29 (1977) H.11, p. 466.
R. Hinterwalnder, "Mineralische Füllstoffe in Leimen, Klebstoffen . . . ", Adhäsion, 11. Jahrgang (1967) magazine 6, pp. 252–262.
K. F. Schroeder, "Neuere Erkenntnisse bei der Auswahl und Anwwendung . . . ", Part I, Adhäsion, 1971, magazine 3, pp. 72–94.

Primary Examiner—Paul R. Michl
Assistant Examiner—LaVonda R. Dewitt
Attorney, Agent, or Firm—Sprung Horn Kramer & Woods

[57] ABSTRACT

Heat-curable adhesive in powder form and solvent-free, containing a mixture of solid phenolic resin with latent hardener in combination with an inorganic pigment mixture.

11 Claims, No Drawings

HEAT-CURABLE ADHESIVE

This is a continuation, of application Ser. No 796,197, filed Nov. 22, 1991 now abandoned.

The object of industrial friction liners is to reduce kinetic energy by friction, that is to say to convert it into heat. Thus, the friction liner/metal bond must withstand high temperatures. This applies in particular to drum brakes and to an even greater extent to disc brakes.

A classic method of bonding which had established itself was the riveting of friction liner and steel support—with the disadvantages of punctiform force transfer, weakening of the material due to bore holes and partial metal/metal friction between rivet and brake drum. Later, riveting could in many cases be replaced or supplemented by the adhesion method of bonding. Even in the production of disc brakes, in the subsequent use of which temperatures in excess of 400° C. can occur, adhesion has been employed for some time. For the most part, solvent-containing adhesives, in particular based on phenolic resin, sometimes combined with nitrile rubber, are used.

Adhesives with solvents have the known disadvantages of flammability and/or toxicity, the latter in particular where chlorinated hydrocarbons such as methylene chloride are still used (for example today still in brake adhesives). For these reasons, brake manufacturers are looking for adhesives which are resistant to high temperatures and free from solvents.

Heat-curing adhesives, which may also be in powder form, cf. U.S. Pat. Nos. 3,655,818 and 3,748,289, based on epoxy resins and dicyandiamide as hardener, or else German Offenlegungsschrift 2,926,945, on the basis of prepolymers from the group of polyesterimides, polyamide imides and polyhydantoins, or on an acrylate base are known. However, such adhesives can only partly meet the high requirements for an adhesive bonding of brake liners for drum or disc brakes.

The object of the invention was to remedy this and provide a high-temperature-resistant adhesive which on the one hand is to be free from solvents and in powder form but on the other hand is suitable for the adhesive bonding of brake liners and meets the high requirements demanded for this.

Accordingly, the invention relates to the adhesives characterised in further detail in the claims, namely solvent-free, powdered, heat-curable adhesives which, in comparison with commercially available brake adhesives containing solvents, withstand at least equally high temperatures (up to in excess of 400° C.) under mechanical load in friction liner/steel adhesive bonds.

The adhesives according to the invention are characterised by a base of solid resin—either phenol (resol and/or novolak) or epoxy-novolak, in each case with latent hardeners—or combinations of the two systems. It has surprisingly been found that these resin systems, together with inorganic pigments, in particular with iron oxides, quartz and/or kaolinite, make possible adhesive bonds of particularly high thermal resistance.

The adhesives according to the invention can be produced by melting the resins under brief heating and mixing them with the usual powdered ingredients, for example in a kneader. After cooling and setting, the mixture can be granulated or ground into powder.

Another possibility for production is to combine the individual ingredients as separate powders and blend them as homogeneously as possible in a suitable vessel having quickly rotating mixing elements.

The coating of the surfaces to be bonded with the adhesive according to the invention can be advantageously performed in two ways:

a) by sprinkling the powder on, for example by means of a vibrating screen; for this purpose it is expedient to heat the surfaces being coated in order to make the powder stick.

b) By electrostatic spraying; particularly suitable for uneven and curved, electrically conductive surfaces.

The powder falling past can be caught and returned to the production cycle, so that there are no or only minor losses.

After coating, the parts to be adhesively bonded are joined together and sent in a holding device for heat curing. The curing is preferably performed under pressure, for example within one hour at 180° C.

In the high-temperature test under 10N load (tilting-shearing stress), test pieces adhesively bonded in such a way, adhered over a surface area of 2 $cm^2$, of steel and brake liner (asbestos-free) reached temperatures of between 400° and 450° C. before fracture.

Furthermore, parting tests at about 300° C. on original drum brake parts similarly adhesively bonded, in most cases led to destruction of the friction liner and only in a few cases to parting in the adhesive joint.

The invention is explained below with reference to examples, without wishing to be to restricted to them.

Figures given in % are % by weight.

EXAMPLE 1

| | |
|---|---|
| Phenolic resin, novolac type | 40.0% |
| Hexamethylene tetramine | 3.0% |
| China clay | 30.0% |
| Silica flour | 37.0% |

EXAMPLE 2

| | |
|---|---|
| Phenol resin, novolac type | 50.0% |
| Hexamethylene tetramine | 4.0% |
| Iron oxide, red | 25.0% |
| China clay | 11.0% |
| Silica flour | 10.0% |

We claim:

1. A solvent-free heat-curable adhesive in power form by weight consisting essentially of about
    a) 25 to 55% of solid, phenolic resin,
    b) 3 to 7% of latent hardener, and
    c) 30 to 80% of a mixture of inorganic pigments selected from the group consisting of quartz, iron oxide, kaolinite, silica flour and china clay.

2. An adhesive according to claim 1, wherein (b) consists essentially of hexamethylene tetramine.

3. An adhesive according to claim 1 wherein, based on the weight of the powder, (c) consists essentially of
    20 to 60% of quartz,
    0 to 40% of iron oxide, and
    2 to 10% of Kaolinite.

4. An adhesive according to claim 1 wherein, based on the weight of the powder, (c) consists essentially of
    30 to 45% of quartz,
    20 to 30% of iron oxide, and 1.5 to 5.5% of Kaolinite.

5. An adhesive according to claim 1 wherein, based on the weight of the powder, (c) consists essentially of
10 to 37% of silica flour,
0 to 25% of iron oxide, and
11 to 30% of China clay.

6. In-the bonding of two materials to one another by applying therebetween an adhesive and then heating under pressure, the improvement which comprises employing as said adhesive an adhesive composition according to claim 1.

7. In the bonding of two materials to one another by applying therebetween an adhesive and then heating under pressure, the improvement which comprises employing as said adhesive an adhesive composition according to claim 2.

8. In the bonding of two materials to one another by applying therebetween an adhesive and then heating under pressure, the improvement which comprises employing as said adhesive an adhesive composition according to claim 3.

9. In the bonding of two materials to one another by applying therebetween an adhesive and then heating under pressure, the improvement which comprises employing as said adhesive an adhesive composition according to claim 4.

10. In the bonding of two materials to one another by applying therebetween an adhesive and then heating under pressure, the improvement which comprises employing as said adhesive an adhesive composition according to claim 5.

11. The method according to claim 6, wherein the materials bonded to one another are components of brake liners for drum and disc brakes.

* * * * *